(12) United States Patent
Luo

(10) Patent No.: US 11,277,505 B2
(45) Date of Patent: Mar. 15, 2022

(54) FOLDABLE CAMERA MODULE AND MOBILE TERMINAL

(71) Applicant: JRD Communication (Shenzhen) LTD., Shenzhen (CN)

(72) Inventor: Liang Luo, Shenzhen (CN)

(73) Assignee: JRD Communication (Shenzhen) LTD., Shenzhen (CN)

( * ) Notice: Subject to any disclaimer, the term of this patent is extended or adjusted under 35 U.S.C. 154(b) by 37 days.

(21) Appl. No.: 16/754,192

(22) PCT Filed: Oct. 10, 2018

(86) PCT No.: PCT/CN2018/109693
§ 371 (c)(1),
(2) Date: Apr. 7, 2020

(87) PCT Pub. No.: WO2019/072192
PCT Pub. Date: Apr. 18, 2019

(65) Prior Publication Data
US 2021/0195004 A1    Jun. 24, 2021

(30) Foreign Application Priority Data
Oct. 10, 2017    (CN) .......................... 201710934938.4

(51) Int. Cl.
*H04M 1/02* (2006.01)

(52) U.S. Cl.
CPC ....... *H04M 1/0264* (2013.01); *H04M 1/0274* (2013.01); *H04M 2250/52* (2013.01)

(58) Field of Classification Search
None
See application file for complete search history.

(56) References Cited

U.S. PATENT DOCUMENTS 7,446,814 B2    11/2008    Yoon
7,733,417 B2    6/2010    Chang
(Continued)

FOREIGN PATENT DOCUMENTS

CN    204231508    3/2015
CN    204652455    9/2015
(Continued)

OTHER PUBLICATIONS

International Search Report and the Written Opinion dated Jan. 3, 2019 From the International Searching Authority Re. Application No. PCT/CN2018/109693 and Translation of Search Report Into English. (9 Pages).

(Continued)

*Primary Examiner* — Quoc D Tran

(57) ABSTRACT

The present disclosure provides a foldable camera module and a mobile terminal including the same. The foldable camera module includes: a camera body housed in a groove on an outer surface of the mobile terminal; a flexible connecting line, an end of which is connected to the camera body; and a fixing member connected to the flexible connecting line and configured to fix the camera body. The camera body can be folded away from the groove in a predetermined direction by the flexible connecting line and fixed to a predetermined position by the fixing member. Therefore, shooting with different angles can be achieved with only one camera.

16 Claims, 3 Drawing Sheets

(56) References Cited

U.S. PATENT DOCUMENTS

| | | | |
|---|---|---|---|
| 2005/0024500 A1 | 2/2005 | Katayama | |
| 2005/0157195 A1* | 7/2005 | Ohashi | H04M 1/0214 |
| | | | 348/333.06 |
| 2006/0268157 A1 | 11/2006 | Chang | |
| 2007/0119028 A1* | 5/2007 | Wang | G06F 1/1681 |
| | | | 16/367 |
| 2010/0304799 A1* | 12/2010 | Leung | H04M 1/0214 |
| | | | 455/575.3 |
| 2013/0010405 A1* | 1/2013 | Rothkopf | H05K 5/0226 |
| | | | 361/679.01 |
| 2019/0079614 A1* | 3/2019 | Maalouf | G06F 3/14 |

FOREIGN PATENT DOCUMENTS

| | | |
|---|---|---|
| CN | 204859235 | 12/2015 |
| CN | 206117742 | 4/2017 |
| CN | 106790826 | 5/2017 |
| CN | 107707696 | 2/2018 |
| EP | 1528759 | 5/2005 |
| KR | 10-2004-0071866 | 8/2004 |
| WO | WO 2016/095170 | 6/2016 |
| WO | WO 2019/072192 | 4/2019 |

OTHER PUBLICATIONS

Supplementary European Search Report and the European Search Opinion dated Apr. 21, 2021 From the European Patent Office Re. Application No. 18866728.1. (10 Pages).

* cited by examiner

FOLDABLE CAMERA MODULE AND MOBILE TERMINAL

RELATED APPLICATIONS

This application is a National Phase of PCT Application No. PCT/CN2018/109693 having International filing date of Oct. 10, 2018, which claims the benefit of priority of Chinese Patent Application No. 201710934938.4, filed on Oct. 10, 2017. The contents of the above applications are all incorporated by reference as if fully set forth herein in their entirety.

FIELD AND BACKGROUND OF THE INVENTION

The present invention relates to the technical field of communication equipment, and particularly to a foldable camera module and a mobile terminal.

With the development of mobile communication technology, mobile phones have become necessities in people's lives, and they have gradually changed, in terms of functions, from traditional mobile phones with communication functions to multifunctional devices that integrate communication functions, multimedia, and entertainment functions. In order to realize functions of taking pictures and video chatting or video calling, many mobile terminals such as mobile phones are now equipped with front cameras and rear cameras, which greatly meets needs of users and makes the mobile terminals very convenient to use.

However, the inventor of the present application founds during long-term research and development that, in a mobile terminal in the prior art, for sake of cost-saving, its front camera often adopts a lower-priced low-pixel camera. Therefore, imaging quality of the front camera is also much worse than that of a rear camera. If the front camera adopts a higher-priced high-pixel camera, cost and power consumption of the mobile terminal will greatly increase. Further, because the front camera has a certain volume, a structure of the mobile terminal becomes complicated when the front camera and a display screen are staggered.

SUMMARY OF THE INVENTION

Embodiments of the present invention provide a foldable camera module and a mobile terminal, which can realize shooting at different angles by only one camera, thereby reducing cost and power consumption of the mobile terminal.

In a first aspect, an embodiment of the present invention provides a foldable camera module for a mobile terminal, comprising:

a camera body housed in a groove on an outer surface of the mobile terminal;

a flexible connecting line, an end of which is connected to the camera body; and a fixing member connected to the flexible connecting line and configured to fix the camera body;

wherein, the camera body can be folded away from the groove in a predetermined direction by the flexible connecting line and fixed to a predetermined position by the fixing member.

In the foldable camera module, the fixing member comprises:

a locking member disposed on the camera body and provided with a buckle; and a folding member disposed on a middle part of the flexible connecting line and provided with a clamping slot matching the buckle;

wherein the camera body and the locking member are folded in the predetermined direction by the flexible connecting line between the locking member and the folding member; and when the camera body is folded to the predetermined position, the buckle is engaged with the clamping slot, thereby fixing the camera body to the predetermined position.

In the foldable camera module, a width of the flexible connecting line is not greater than a width of the folding member.

In the foldable camera module, the flexible connecting line is an ultra-flexible cable.

In the foldable camera module, the groove is disposed on a back-cover side of the mobile terminal;

the foldable camera module serves as a rear camera of the mobile terminal before being folded; and when the camera body is fixed to the predetermined position, the foldable camera module serves as a front camera of the mobile terminal.

In the foldable camera module, the camera body is partially embedded in the groove.

In the foldable camera module, the camera body is completely embedded in the groove.

In a second aspect, an embodiment of the present invention provides a mobile terminal comprising at least one foldable camera module. The foldable camera module comprises: a camera body housed in a groove on an outer surface of the mobile terminal; a flexible connecting line, an end of which is connected to the camera body; and a fixing member connected to the flexible connecting line and configured to fix the camera body; wherein, the camera body can be folded away from the groove in a predetermined direction by the flexible connecting line and fixed to a predetermined position by the fixing member.

In the mobile terminal, the fixing member comprises:

a locking member disposed on the camera body and provided with a buckle; and a folding member disposed on a middle part of the flexible connecting line and provided with a clamping slot matching the buckle;

wherein the camera body and the locking member are folded in the predetermined direction by the flexible connecting line between the locking member and the folding member; and when the camera body is folded to the predetermined position, the buckle is engaged with the clamping slot, thereby fixing the camera body to the predetermined position.

In the mobile terminal, the groove is disposed on a back-cover side of the mobile terminal;

the foldable camera module serves as a rear camera of the mobile terminal before being folded; and when the camera body is fixed to the predetermined position, the foldable camera module serves as a front camera of the mobile terminal.

In the mobile terminal, the folding member is disposed on a top frame of the mobile terminal.

In the mobile terminal, the flexible connecting line is an ultra-flexible cable.

In the mobile terminal, the camera body is partially embedded in the groove.

In the mobile terminal, the camera body is completely embedded in the groove.

In the mobile terminal, a width of the flexible connecting line is not greater than a width of the folding member.

In the mobile terminal, an end of the flexible connecting line is connected to the camera body by one or more of welding, gluing, engaging, and screwing.

In the mobile terminal, the fixing member is connected to the flexible connecting line by one or more of welding, gluing, engaging, and screwing.

In the mobile terminal, the camera body is shaped as a cylinder, a sphere, a cuboid, or a cube.

In the mobile terminal, the groove is shaped as a cylinder, a sphere, a cuboid, or a cube.

In the mobile terminal, a number of the folding member depends on a number of the locking member.

The foldable camera module provided by the present invention comprises: a camera body housed in a groove on an outer surface of the mobile terminal; a flexible connecting line, an end of which is connected to the camera body; and a fixing member connected to the flexible connecting line and configured to fix the camera body. The camera body can be folded away from the groove in a predetermined direction by the flexible connecting line and fixed to a predetermined position by the fixing member. Therefore, the present invention can utilize foldability of the flexible connecting line to make the camera body be folded in the predetermined direction by the flexible connecting line and fixed to the predetermined position by the fixing member, so that a lens of the camera body can be oriented in different directions, and shooting with different angles can be achieved with only one camera, thereby reducing a number of cameras, facilitating simplification of a structure of the mobile terminal, and reducing cost and power consumption of the mobile terminal.

BRIEF DESCRIPTION OF THE SEVERAL VIEWS OF THE DRAWINGS

In order to more clearly illustrate technical solutions in embodiments of the present invention, a brief description of accompanying drawings used in description of the embodiments will be given below. Obviously, the accompanying drawings in the following description are merely some embodiments of the present invention. For those skilled in the art, other drawings may be obtained from these accompanying drawings without creative labor.

DESCRIPTION OF SPECIFIC EMBODIMENTS OF THE INVENTION

The technical solutions in the embodiments of the present invention will be clearly and completely described below with reference to the accompanying drawings used in the embodiments of the present invention. Obviously, the described embodiments are only a part of the embodiments of the present invention, but not all embodiments. Other embodiments obtained by those skilled in the art based on the embodiments of the present invention without any creative labor belong to the scope of the present invention.

Figure 1:
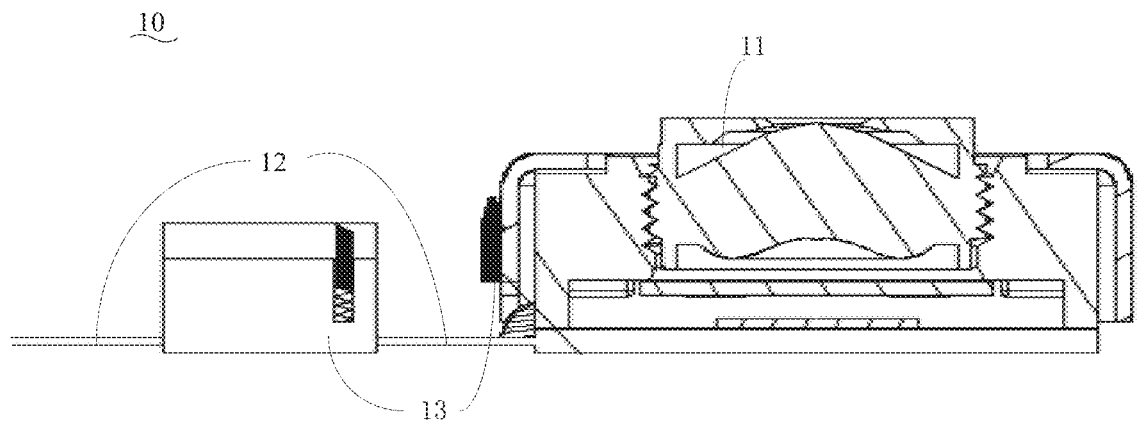
FIG. 1 is a schematic structural diagram of a foldable camera module according to an embodiment of the present invention.

Please refer to FIG. 1, which is a schematic structural diagram of a foldable camera module according to an embodiment of the present invention. In this embodiment, a foldable camera module 10 comprises a camera body 11, a flexible connecting line 12, and a fixing member 13.

The foldable camera module 10 is used for a mobile terminal (not shown). The mobile terminal in this embodiment may specifically be a mobile phone, a tablet computer, or another mobile terminal with a camera. The mobile terminal is provided with the foldable camera module 10. The foldable camera module 10 may be connected to a body of the mobile terminal by the flexible connecting line 12. For example, the foldable camera module 10 may be connected to a circuit board (not shown) of the mobile terminal by the flexible connecting line 12. In other embodiments, the foldable camera module 10 may be connected to the body of the mobile terminal in other ways. When a user needs to shoot, the user can trigger a shooting function of the mobile terminal. After receiving a shooting request triggered by the user, the mobile terminal activates the foldable camera module 10 to enter a shooting state.

Specifically, the camera body 11 is housed in a groove (not shown) on an outer surface of the mobile terminal. In this embodiment, the outer surface of the mobile terminal is provided with a groove corresponding to the camera body 11, and the camera body 11 may be partially embedded in the groove. In other embodiments, the camera body 11 may also be completely embedded in the groove. The camera body 11 may be shaped as a cylinder, a sphere, a cuboid, or a cube. The groove may be shaped as a cylinder, a sphere, a cuboid, or a cube.

An end of the flexible connecting line 12 is connected to the camera body 11. Specifically, an end of the flexible connecting line 12 may be connected to the camera body 11 by one or more of welding, gluing, engaging, and screwing. The other end of the flexible connecting line 12 may be connected to the circuit board inside the mobile terminal. In this embodiment, the camera body 11 is located inside or outside the groove by bending the flexible connecting line 12 to a certain angle.

The fixing member 13 is connected to the flexible connecting line 12 and is configured to fix the camera body 11. Specifically, in this embodiment, the fixing member 13 may be connected to the flexible connecting line 12 by one or more of welding, gluing, engaging, and screwing, and is not limited herein.

The camera body 11 can be folded away from the groove in a predetermined direction by the flexible connecting line 12 and fixed to a predetermined position by the fixing member 13. Specifically, under a manual action of the user or control of the mobile terminal, the camera body 11 is driven to fold in a predetermined direction by the flexible connecting line 12 and is fixed to a predetermined position by the fixing member 13. In this embodiment, when the flexible connecting line 12 moves in a predetermined direction toward a display screen, the camera body 11 is driven to fold in the direction toward the display screen, so that the camera body 11 leaves the groove and is fixed to a predetermined position by the fixing member 13. In other embodiments, when the flexible connecting line 12 moves in a predetermined opposite direction, the camera body 11 is driven to fold in the predetermined opposite direction, so that the camera body 11 approaches the groove and is fixed to a predetermined position by the fixing member 13.

A foldable camera module provided by this embodiment comprises: a camera body housed in a groove on an outer surface of the mobile terminal; a flexible connecting line, an end of which is connected to the camera body; and a fixing member connected to the flexible connecting line and configured to fix the camera body. The camera body can be folded away from the groove in a predetermined direction by the flexible connecting line and fixed to a predetermined position by the fixing member. In the above manner, foldability of the flexible connecting line can be utilized to make the camera body be folded in the predetermined direction by the flexible connecting line and fixed to the predetermined position by the fixing member, so that a lens of the camera body can be oriented in different directions, and shooting with different angles can be achieved with only one camera, thereby reducing a number of cameras, facilitating simplification of a structure of the mobile terminal, and reducing cost and power consumption of the mobile terminal.

Figure 2:
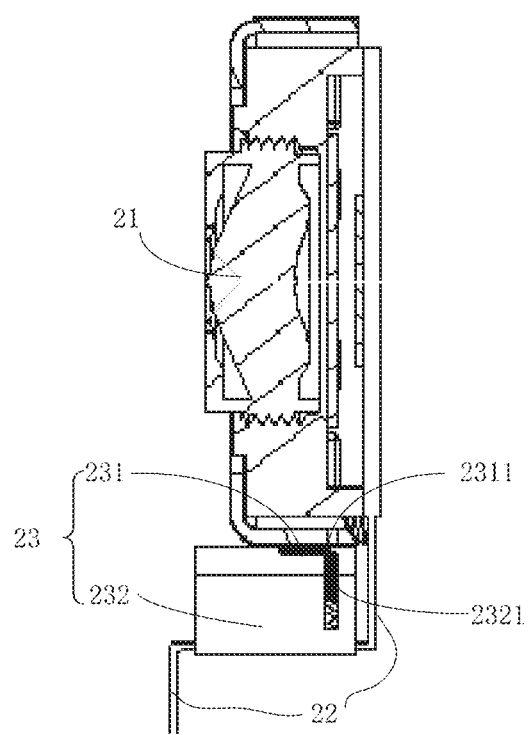
FIG. 2 is a schematic structural diagram of a foldable camera module according to another embodiment of the present invention.

Please refer to FIG. 2, which is a schematic structural diagram of a foldable camera module according to another embodiment of the present invention. In this embodiment, a fixing member 23 comprises a locking member 231 and a folding member 232.

Specifically, the locking member 231 is disposed on a camera body 21 and provided with a buckle 2311. Specific positions of the locking member 231 and the buckle 2311 on the camera body 21 may be set according to application requirements, and are not limited herein. Numbers of the locking members 231 and the buckles 2311 may also be set according to application requirements, and are not limited herein.

The folding member 232 is disposed on a middle part of a flexible connecting line 22 and provided with a clamping slot 2321 matching the buckle 2311. It should be noted that the middle part here refers to the flexible connecting line 22 between the camera body 21 and a circuit board. A specific position of the folding member 232 on the flexible connecting line 22 may be set according to the specific position of the locking member 231. A number of the folding member 232 may also be set according to the number of the locking member 231. The clamping slot 2321 matches the buckle 2311. Specifically, the position of the buckle 2311 corresponds to that of the clamping slot 2321.

The camera body 21 may be folded in a predetermined direction by the flexible connecting line 22 between the locking member 231 and the folding member 232. When the camera body 21 is folded to a predetermined position, the buckle 2311 is engaged with the clamping slot 2321, thereby fixing the camera body 21 to the predetermined position. Specifically, in this embodiment, when the camera body 21 is folded away from a groove to the predetermined position in the predetermined direction, the buckle 2311 is engaged with the clamping slot 2321. In other embodiments, when the camera body 21 leaves the predetermined position, the buckle 2311 is disengaged from the clamping slot 2321.

In this embodiment, the buckle 2311 and the clamping slot 2321 are tightly fastened, so that a degree of fixing the camera body 21 at the predetermined position is improved, and the camera body 21 is not easy to shift. This enables the foldable camera module to work normally when it is shooting.

In an embodiment, a width of the flexible connecting line 22 is not greater than a width of the folding member 232. Specifically, in this embodiment, the width of the flexible connecting line 22 may be less than the width of the folding member 232. In other embodiments, the width of the flexible connecting line 22 may be equal to the width of the folding member 232.

In an embodiment, the flexible connecting line 22 is an ultra-flexible cable. In this embodiment, foldability of the ultra-flexible cable can increase foldability of the camera body 21.

Figure 3:
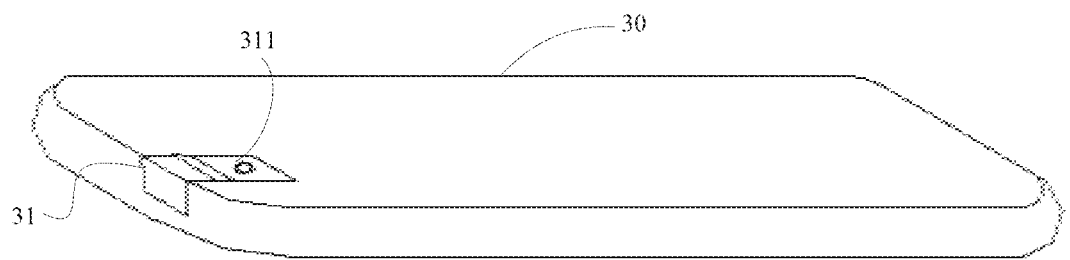
FIG. 3 is a schematic structural diagram of a foldable camera module disposed on a mobile terminal according to another embodiment of the present invention.

Please refer to FIG. 3, which is a schematic structural diagram of a foldable camera module disposed on a mobile terminal according to another embodiment of the present invention. In an embodiment, a groove (not shown) is disposed on a back-cover side of a mobile terminal 30. Specifically, when a camera body 311 is located inside the groove, a foldable camera module 31 faces a direction away from a display screen of the mobile terminal 30 and serves as a rear camera of the mobile terminal 30. When the camera body 311 leaves the groove and is folded and fixed to a predetermined position, the foldable camera module 31 faces a direction that the display screen of the mobile terminal faces, and serves as a front camera of the mobile terminal 30.

In the above manner, in this embodiment, the camera body can be folded, and can be fixed to a predetermined position by the fixing member, so that a lens of the camera body faces the display screen, thereby realizing function of a front camera. It is no longer necessary to dispose a front camera, which can effectively reduce a space occupied by the camera module on a surface of the mobile terminal, increase a screen ratio of the mobile terminal, and achieve ultra-narrow frames or even no frames.

Figure 4:
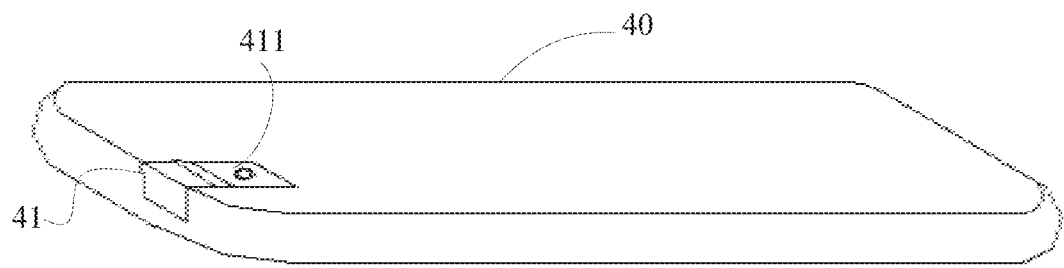
FIG. 4 is a schematic structural diagram of a mobile terminal according to an embodiment of the present invention.
Figure 5:
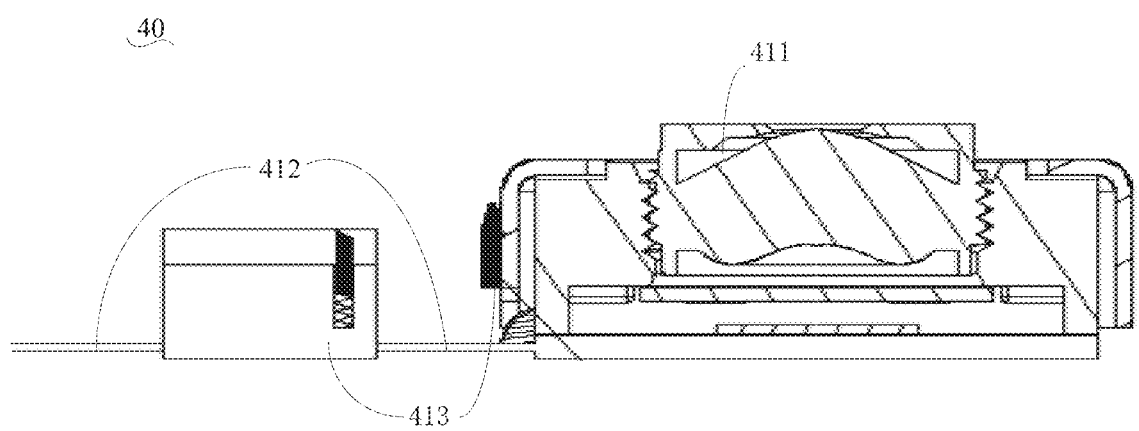
FIG. 5 is a partial schematic structural diagram of the mobile terminal of FIG. 4.

Please refer to FIG. 4 and FIG. 5. FIG. 4 is a schematic structural diagram of a mobile terminal according to an embodiment of the present invention. FIG. 5 is a partial schematic structural diagram of the mobile terminal of FIG. 4. In this embodiment, a mobile terminal 40 comprises at least one foldable camera module 41. The foldable camera module 41 comprises a camera body 411, a flexible connecting line 412, and a fixing member 413.

Specifically, the camera body 411 is housed in a groove (not shown) on an outer surface of the mobile terminal 40. An end of the flexible connecting line 412 is connected to the camera body 411. The fixing member 413 is connected to the flexible connecting line 412 and configured to fix the camera body 411. The camera body 411 can be folded away from the groove in a predetermined direction by the flexible connecting line 412 and fixed to a predetermined position by the fixing member 413.

For details, reference may be made to the foregoing embodiments of the foldable camera module, and details are not described herein.

A mobile terminal provided by this embodiment comprises at least one foldable camera module. The foldable camera module comprises: a camera body housed in a groove on an outer surface of the mobile terminal; a flexible connecting line, an end of which is connected to the camera body; and a fixing member connected to the flexible connecting line and configured to fix the camera body. The camera body can be folded away from the groove in a predetermined direction by the flexible connecting line and fixed to a predetermined position by the fixing member. In the above manner, in this embodiment, foldability of the flexible connecting line can be utilized to make the camera body be folded in the predetermined direction by the flexible connecting line and fixed to the predetermined position by the fixing member, so that a lens of the camera body can be oriented in different directions, and shooting with different angles can be achieved with only one camera, thereby reducing a number of cameras, facilitating simplification of a structure of the mobile terminal, and reducing cost and power consumption of the mobile terminal.

Figure 6:
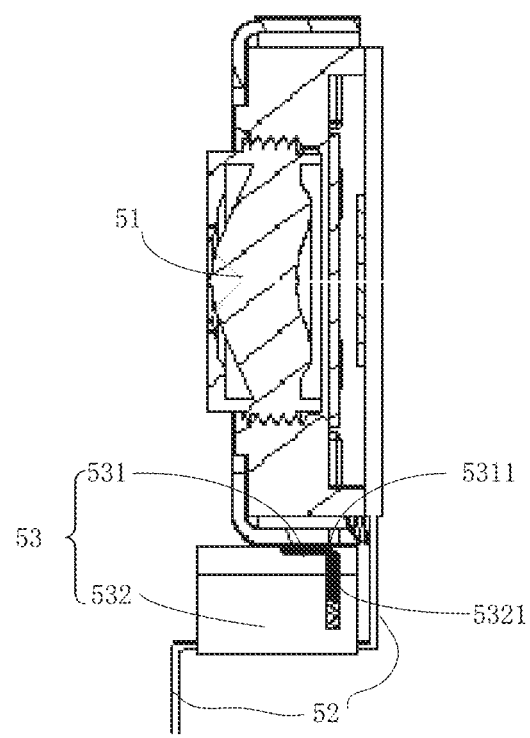
FIG. 6 is a partial schematic structural diagram of a mobile terminal according to another embodiment of the present invention.

Please refer to FIG. 6, which is a partial schematic structural diagram of a mobile terminal according to another embodiment of the present invention. In this embodiment, a fixing member 53 comprises a locking member 531 and a folding member 532. Specifically, the locking member 531 is connected to an end of a flexible connecting line 52 away from a camera body 51 and is provided with a buckle 5311. The folding member 532 is disposed on a middle part of the flexible connecting line 52 and is provided with a clamping slot 5321 matching the buckle 5311. The camera body 51 and the locking member 531 are folded in a predetermined direction by the flexible connecting line 52 between the locking member 531 and the folding member 532. When the camera body 51 is folded to a predetermined position, the buckle 5311 is engaged with the clamping slot 5321, thereby fixing the camera body 51 to the predetermined position.

For details, reference may be made to the foregoing embodiments of the fixing member, and details are not described herein.

In an embodiment, a groove is disposed on a back-cover side of the mobile terminal.

Figure 7:
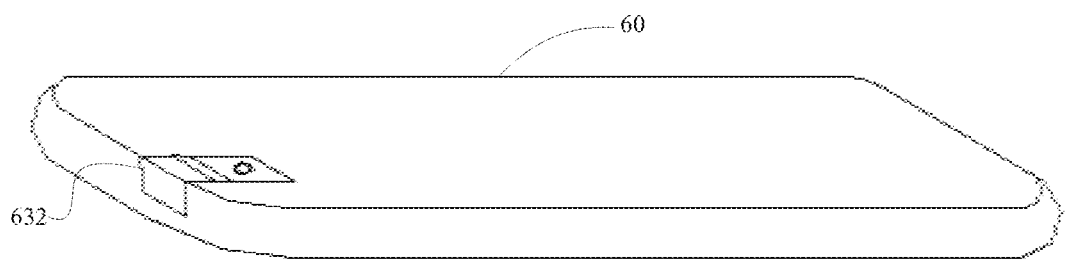
FIG. 7 is a schematic structural diagram of a mobile terminal according to another embodiment of the present invention.

For details, reference may be made to the foregoing embodiments of the groove, and details are not described herein Please refer to FIG. 7, which is a schematic structural diagram of a mobile terminal according to another embodiment of the present invention. In this embodiment, a folding member 632 is disposed on a top frame of a mobile terminal 60. A specific position of the folding member 632 on the top frame of the mobile terminal 60 may be set according to application requirements, which is not limited here and depends on situations.

In an embodiment, a flexible connecting line is an ultra-flexible cable, so that a camera module can be folded by the ultra-flexible cable.

In the above manner, foldability of the flexible connecting line can be utilized to make a camera body be folded in a predetermined direction by the flexible connecting line and fixed to a predetermined position by a fixing member, so that a lens of the camera body can be oriented in different directions, and shooting with different angles can be achieved with only one camera, thereby reducing a number of cameras, facilitating simplification of a structure of the mobile terminal, and reducing cost and power consumption of the mobile terminal. Furthermore, when a groove for the camera body is disposed on a back cover side of the mobile terminal, the camera body can be fixed to the predetermined position by the fixing member, so that a lens of the camera body faces a display screen, thereby realizing function of a front camera. It is no longer necessary to dispose a front camera, which can effectively reduce a space occupied by the camera module on a surface of the mobile terminal, increase a screen ratio of the mobile terminal, and achieve ultra-narrow frames or even no frames.

The above descriptions are embodiments of the present invention only and thus do not limit scope of the present invention. Any equivalent structure or equivalent process modified from specification and accompanying drawings of the present invention, or using the specification and the accompanying drawings directly or indirectly in other related technical fields, are included in the scope of the present invention.

What is claimed is:

1. A foldable camera module for a mobile terminal, comprising:
   a camera body housed in a groove on an outer surface of the mobile terminal;
   a flexible cable, wherein an end of the flexible cable is connected to the camera body, and the other end of the flexible cable is connected to the mobile terminal; and
   a locking member disposed on the camera body and provided with a buckle; and
   a folding member disposed on a middle part of the flexible cable and provided with a clamping slot matching the buckle;
   wherein when the camera body is folded away from the groove to a predetermined position in a predetermined direction by a section of the flexible cable between the locking member and the folding member, the buckle of the locking member is engaged with the clamping slot of the folding member, thereby fixing the camera body to the predetermined position.

2. The foldable camera module according to claim 1, wherein a width of the flexible cable is not greater than a width of the folding member.

3. The foldable camera module according to claim 1, wherein
   the groove is disposed on a back-cover side of the mobile terminal;
   the foldable camera module serves as a rear camera of the mobile terminal before being folded; and
   when the camera body is fixed to the predetermined position, the foldable camera module serves as a front camera of the mobile terminal.

4. The foldable camera module according to claim 1, wherein the camera body is partially embedded in the groove.

5. The foldable camera module according to claim 1, wherein the camera body is completely embedded in the groove.

6. A mobile terminal, comprising at least one foldable camera module, wherein the foldable camera module comprises:
   a camera body housed in a groove on an outer surface of the mobile terminal;
   a flexible cable, wherein an end of the flexible cable is connected to the camera body, and the other end of the flexible cable is connected to the mobile terminal; and
   a locking member disposed on the camera body and provided with a buckle; and
   a folding member disposed on a middle part of the flexible cable and provided with a clamping slot matching the buckle;
   wherein when the camera body is folded away from the groove to a predetermined position in a predetermined direction by a section of the flexible cable between the locking member and the folding member, the buckle of the locking member is engaged with the clamping slot of the folding member, thereby fixing the camera body to the predetermined position.

7. The mobile terminal according to claim 6, wherein
   the groove is disposed on a back-cover side of the mobile terminal;
   the foldable camera module serves as a rear camera of the mobile terminal before being folded; and
   when the camera body is fixed to the predetermined position, the foldable camera module serves as a front camera of the mobile terminal.

8. The mobile terminal according to claim 6, wherein the folding member is disposed on a top frame of the mobile terminal.

9. The mobile terminal according to claim 6, wherein the camera body is partially embedded in the groove.

10. The mobile terminal according to claim 6, wherein the camera body is completely embedded in the groove.

11. The mobile terminal according to claim 6, wherein a width of the flexible cable is not greater than a width of the folding member.

12. The mobile terminal according to claim 6, wherein an end of the flexible cable is connected to the camera body by one or more of welding, gluing, engaging, and screwing.

13. The mobile terminal according to claim 6, wherein the folding member is connected to the flexible cable by one or more of welding, gluing, engaging, and screwing.

14. The mobile terminal according to claim 6, wherein the camera body is shaped as a cylinder, a sphere, a cuboid, or a cube.

15. The mobile terminal according to claim 6, wherein the groove is shaped as a cylinder, a sphere, a cuboid, or a cube.

16. The mobile terminal according to claim 6, wherein a number of the folding member depends on a number of the locking member.

\* \* \* \* \*